United States Patent [19]

Maffey

[11] 4,354,890

[45] Oct. 19, 1982

[54] METHOD OF PRODUCING REINFORCED PAPER

[75] Inventor: Peter M. Maffey, Wantirna, Australia

[73] Assignee: Bowater Tutt Industries, Pty. Ltd., Melbourne, Australia

[21] Appl. No.: 246,905

[22] Filed: Mar. 23, 1981

[30] Foreign Application Priority Data

Mar. 24, 1980 [AU] Australia .............................. PE2878

[51] Int. Cl.$^3$ ......................... B32B 31/00; B32B 7/14

[52] U.S. Cl. .................................... 156/264; 156/291; 156/332; 281/21 R; 427/288; 427/289; 427/398.2; 428/195; 428/198

[58] Field of Search ....................... 156/291, 332, 264; 427/288, 289, 398.2; 281/21 R; 428/195, 198

[56] References Cited

U.S. PATENT DOCUMENTS

| | | | |
|---|---|---|---|
| 3,479,203 | 11/1969 | Broadhurst | 427/289 X |
| 4,023,829 | 5/1977 | Staats | 156/291 X |
| 4,147,580 | 4/1979 | Buell | 156/291 |
| 4,243,702 | 1/1981 | Walsh | 427/288 X |

*Primary Examiner*—Michael R. Lusignan

[57] ABSTRACT

The method of producing sheets of reinforced paper comprising printing a hot-melt adhesive at pre-selected positions onto the surface of a continuously moving web of paper. The method also includes cooling the adhesive and cutting and trimming the web into sheets of paper, the adhesive forming the reinforcement at desired positions on the paper. The hot-melt adhesive is preferably a linearic copolyester such as GRILESTA 6505 (GRILESTA is a Registered Trade Mark).

7 Claims, 3 Drawing Figures

METHOD OF PRODUCING REINFORCED PAPER

The present invention relates to a method for producing reinforced paper. More particularly, but not exclusively, the present invention relates to reinforced loose-leaf punched sheets with the additional optional feature that such reinforced sheets can be reblocked later if desired.

Where a page of paper, particularly in a loose-leaf binder, receives a lot of use, it tends to tear and pull away from the binder, and may also become dog-eared. Heavy grade paper can be used, but is of course much more expensive and is, therefore, generally unsuitable for use in binders. Alternatively, the paper can be reinforced around the punch-holes.

One prior method of reinforcing the area around the punch-holes is by the application of a narrow strip of thin polyester film material, such as Nylon, Melenex or Mylar, or similar material which is adhered to the paper by a heat bonded adhesive or glue. The application of this material therefore comprises several steps, i.e. the coating of the strip of film with an adhesive or glue, the step of applying the strip of film to the paper in the position desired, and, in the case of heat bonded adhesive, the final step of applying heat to the strip to cause it to adhere to the paper.

Another means of reinforcing loose-leaf punched sheets is by the application of reinforcements of plastics, nylon, linen or heavy paper which fit around the punched hole, these reinforcements being either self-adhesive, or requiring to be moistened.

It would be advantageous to provide a reinforcing means particularly for use with loose-leaf punched sheets and a method for applying this material, which is more economical to produce and apply than the reinforcements of the prior art.

Accordingly, the present invention provides a method of producing sheets of reinforced paper comprising printing a hot-melt adhesive at pre-selected positions onto the surface of a continuously moving web of paper, cooling the adhesive and cutting and trimming the web into sheets of paper.

Preferably, the paper sheet is a loose-leaf punched sheet and the reinforcement means is applied to the area around the punched holes.

Preferably, the hot-melt adhesive is GRILESTA 6506. (GRILESTA is the Trade Mark for a linearic copolyester manufactured and sold by Emser Werke AG, of Zurich, Switzerland).

The present invention also includes a reinforced sheet manufactured by the method disclosed above.

Figure 1:
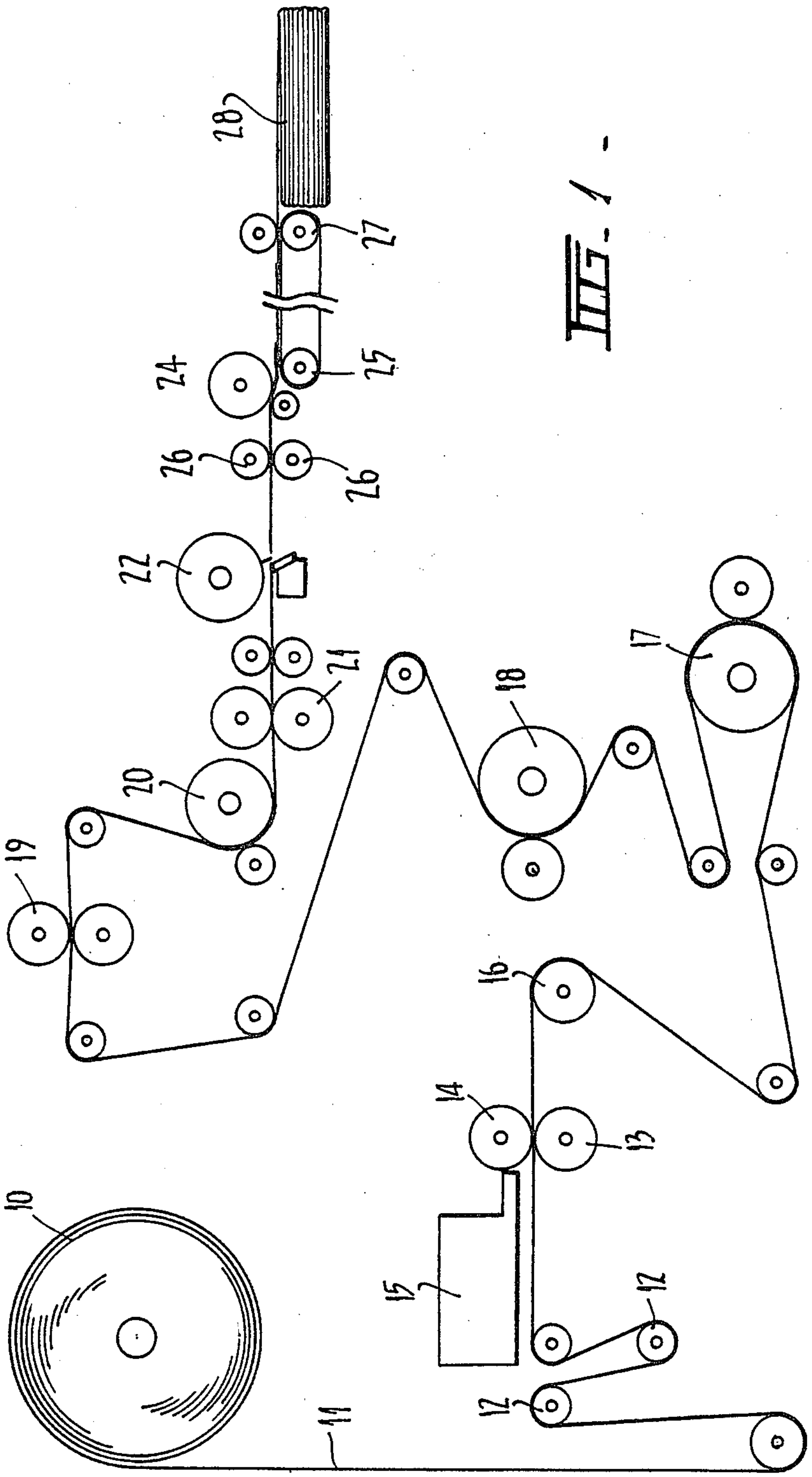
Figure 2:
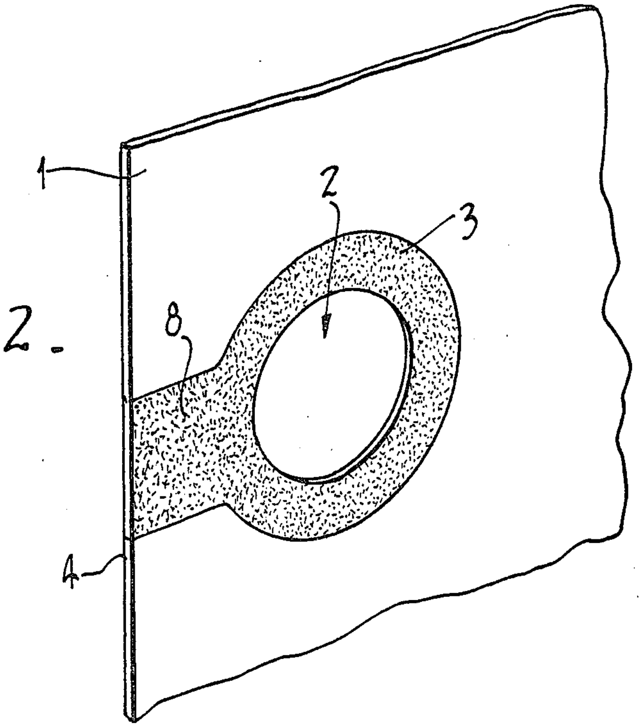
Figure 3:
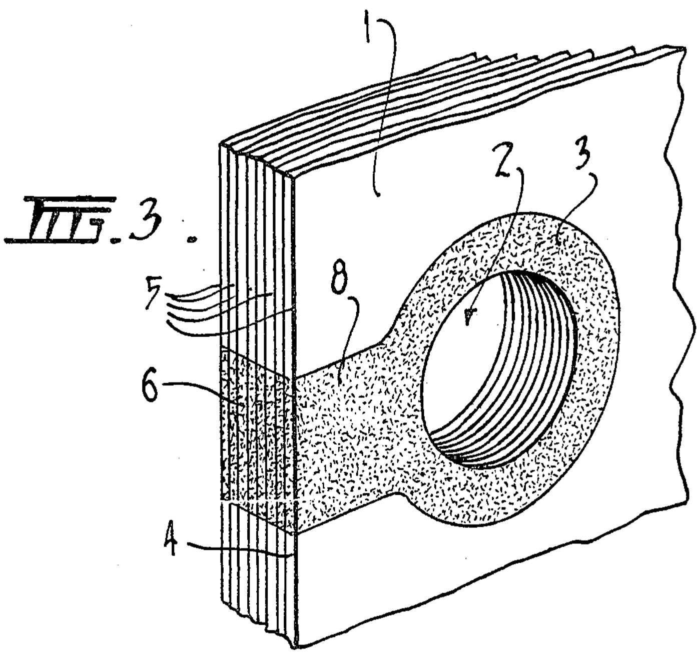

The present invention will now be described by way of example only with reference to the accompanying drawings in which:

FIG. 1 is a schematic flow diagram illustrating the process for manufacturing loose-leaf punched sheet, FIG. 2 is a view of part of a sheet showing a punched hole, and FIG. 3 is a perspective view of part of several superimposed sheets having punched holes.

As shown in FIG. 1, a process for manufacturing punched loose-leaf sheets commences with the paper being provided on a large reel 10. A web 11 of the paper is then fed via tensioning rollers 12 onto the upper surface of an impression roller 13 which is arranged to run adjacent the periphery of a print wheel 14 which is in turn fed with hot-melt adhesive from a melt tank, supply pump and extrusion head 15. Details of the print wheel and extrusion head will be described later in the specification. The purpose of the print roll is to apply or print hot-melt adhesive onto the web of paper at selected positions. The web 11 then passes through a chill roller 16 to cool and solidify the hot-melt adhesive.

The web of paper is then passed through two sets of impression and print stereo rollers 17 and 18. The print stereo rollers imprint on the lines, margins and any other desired printing onto the paper. On leaving the print stereo rollers 17 and 18, the web of paper is passed through a top and bottom sprocket punch wheel 19 that punches the holes in the desired positions in the margin of the paper. The web is then tensioned through a roller 20 to be passed through a side trim and centre slit blade assembly 21 that trims the paper to the desired size. Once the web has been trimmed, it is then passed via draw rollers to the cutting surface of a rotary cutting cylinder 22 that cuts the web to desired lengths. The cut lengths are then transported via draw rollers 26 to an overlapping finger assembly 24 that superimposes the sheets whilst at the same time, the carrier tape is applied to the edge of the sheets via carrier tape tollers 25. The sheets are then fed through draw rollers 27 to a collator or sheet pile counter so that the sheets may be stacked in piles of predetermined numbers for delivery to the packing stage of the process.

The important feature of the process described above is the application of the hot-melt adhesive to the web of paper by use of a printing technique. The hot melt adhesive is a hot-melt thermoplastic resin marketed under the name GRILESTA 6506 (Grilesta is the Trade Mark for a linearic copolyester manufactured and sold by Emser Werke AG, of Zurich, Switzerland). GRILESTA is used in the form of granules that are melted in a melt tank 15. The melt tank 15 may vary in design but a preferred unit is the unit named DYNAPPLY 21 (Registered Trade Mark) manufactured by the L.T.I. Corporation. This tank incorporates a pump and an extrusion head as well as heating means to melt the granules into liquid form. The tank operates at a temperature range of between 38° to 177° C. which is adjustable. The melt rate is 5.67 kg/hr and the warm-up time for a full tank is approximately 50 minutes. The tank supplies a continuous delivery of adhesive at constant pressure. The hot-melt tank 15 supplies the melted adhesive to the print wheel 14 that runs against the impression roller 13. The preferred model for the print wheel is a unit manufactured by the L.T.I. Corporation that transfers adhesive in a precise pattern to a wide variety of sub-strates at variable line speeds. The printing technique provides strict volume and pattern control for adhesive transfer in upward and downward directions. It is this precise application that results in a considerable saving in adhesive. The print wheel operates in conjunction with the adhesive supply unit and is available in a range of sizes. The pattern on the wheel is drilled or etched to the customer requirement. The print wheel has a temperature range of between 93° to 204° C. and a warm-up time of 15 minutes.

Relevant characteristics of GRILESTA 6506 are set out on the following table.

| Characteristics | Test Method | Value |
|---|---|---|
| | GRILESTA 6505 | |
| Chemical Structure | | Linearic copolyester |
| Form | | Granules |

-continued

| Characteristics | Test Method | Value |
|---|---|---|
| Colour | | Opaque - white |
| Storage | | At least one year, if stored in a dry place at room temperature |
| Humidity Absorption | 65% RH, 23° C. | 0.3% |
| Density | DIN 53479 | 1.3 kg/dm$^3$ |
| Melting Range | Microscope | 130–140° C. |
| Softening Point | DIN 1995 | Close to melting range |
| Flexural Strength at Convex Deflection | DIN 53452 | 52 N/mm$^2$ |
| Deflection | | 6 mm |
| Impact Strength 23° C. | DIN 53453 | No break |
| Ball Indentation Hardness 10 sec. | VDE 0302 | 93 N/mm$^2$ |
| Shore Hardness D | | 74 |
| Dissipation Factor $10^5$ Hz | DIN 53483 | 0.018 tang $\delta$ |
| Dielectric constant $10^5$ Hz | DIN 53485 | 3.0 |
| Melt Viscosity | DIN 53735 (Grilesta = 21.2 N) | |
| 160° C. | | 65.10$^4$ mPa's |
| 180° C. | | 35.10$^4$ mPa's |
| 200° C. | | 19.10$^4$ mPa's |
| | GRILESTA 6506 | |
| 230° C. | | 75000 mPa's |
| 260° C. | | 40000 mPa's |
| Tensile Strength (Yield point) | DIN 53455 | 10 N/mm$^2$ |
| Elongation at yield | DIN 53455 | 13.5% |
| Tensile Strength at break | DIN 53455 | 11 N/mm$^2$ |
| Elongation at break | DIN 53455 | 265% |
| Peel Strength at Room Temperature (Steel 37 - pickling according to VD 13821) | | |
| Initial Tear Resistance | DIN 53282 | 10.7 N/mm |
| Tear-on Resistance | DIN 53282 | 8.4 N/mm |

The table shows that GRILESTA is suited for hot-melt used by printing, or extrusion rolling on the paper web, having outstanding qualities of tear resistance and toughness, and ease of application within an economical temperature range as well as high adhesive and cohesive bond strength and outstanding solvent resistance.

GRILESTA may be applied either as a long strip adjacent the inner edge of the paper or preferably around the punched holes themselves, so that the area around the punched holes is reinforced. It can also be applied whenever it is required to add more strength to the sheet, the outer edge, such as corners or for the reinforcement of tabs or so that only the area actually required to be reinforced is covered thereby effecting greater saving in materials.

Alternatively, the entire sheet may be covered after printing, to give strength and protection against dirt and moisture for use in recipe books, reference manuals, book covers, and similar products.

In a preferred embodiment illustrated in FIG. 2 loose sheets of paper are produced by the method described above to have punched holes 2 adjacent the inner edge 4 of the sheet 1. The GRILESTA is applied around the hole 2 to terminate in a neck portion 8 that connects the reinforcement to the inner edge 4. This effect provides the embodiment illustrated in FIG. 3 where there is provided means of binding a number of loose-leaf sheets. The sheets after use are reblocked, and welded and bound by heating the edge of the sheet of paper where the reinforcing means has been applied. This heating is carried out with a match, cigarette lighter, hot wire, Sola glass or domestic iron. By manufacturing loose-leaf sheets in this manner, it has been found that the hot-melt reinforcement when cool has a tensile strength of a minimum of four times the strength of the paper to which it is applied. For example, the tear of 65 GSM Bond is increased to the tear of approximately 250 GSM Bond. The reinforcement is coated to no more than 0.0005 inches. Another important feature is that the GRILESTA is tackless at temperatures between 0° F. and 150° F. When printing the hot-melt adhesive onto the web of paper, the adhesive is initially applied in a configuration in which two neck portions 8 abut coaxially to define the opposed circular reinforcements. The web is then cut to define the edges 4 of the sheet with the reinforcement as shown in FIG. 2. The cutting action in effect causes a slight 'bleed through' of the adhesive onto the edge of the sheet.

FIG. 3 shows several sheets 5, with reinforcing means 3 extending to sheet edge 4 at region 6. This enables the several sheets to be bound by applying heat to region 6 and causing the hot-melt reinforcing means 3 to melt adjacent the edge of each sheet. On cooling, the sheets are welded together at this point.

It will of course be understood that the invention can be performed with any other hot-melt thermoplastic resin having similar properties and characteristics to GRILESTA.

One advantage of the present invention over the prior art is that the reinforcing means of the invention is applied simply in one step by melting the resin and printing, rolling, extruding the required thickness of resin on the paper web, and obviates the use of the three-step process to apply adhesive to the polyester film, place the polyester film on the paper and then apply heat in order to melt the adhesive and thereby adhere the film to the paper.

To reinforce the edge of a sheet of paper with MYLAR (Registered Trade Mark) costs approximately $1.13 c per 1000 sheets for the MYLAR alone. In contrast, to reinforce a sheet with GRILESTA in the manner of the invention disclosed herein costs $0.05 c per 100 sheets. Accordingly, it is considered that the end product is far cheaper yet just as effective as the product of the prior art.

Having now described my invention, what I claim is:

1. A method of producing sheets of reinforced paper comprising printing a hot-melt adhesive onto the surface of a continuously moving web of paper in a configuration comprising two annuli of reinforcement joined by a neck portion, cooling the adhesive, cutting the web across the neck portion, and trimming the web into sheets of paper.

2. The method of claim 1 comprising punching holes into the web of the paper at positions where the paper has been coated with hot-melt adhesive.

3. The method according to claim 1 wherein the hot-melt adhesive is a linearic copolyester in liquid form.

4. The method according to claim 1 comprising an additional step of reblocking the sheets of paper and securing the sheets together by heating the edges of the sheets adjacent the reinforcement to melt the adhesive.

5. The method according to claim 1 comprising cutting the web so that each sheet has an annulus of reinforcement adjacent one edge, but spaced therefrom by half the neck portion.

6. The method according to claim 3 wherein said linearic copolyester is heated to a temperature above 130° C.

7. A reinforced sheet of paper manufactured by the method of claim 1.

* * * * *